US012230977B2

(12) United States Patent
Nakao et al.

(10) Patent No.: US 12,230,977 B2
(45) Date of Patent: Feb. 18, 2025

(54) CONTACTLESS POWER FEED APPARATUS AND POWER TRANSMISSION METHOD

(71) Applicant: OMRON Corporation, Kyoto (JP)

(72) Inventors: Goro Nakao, Kyoto (JP); Yuki Ito, Kyoto (JP); Taichi Mishima, Kyoto (JP)

(73) Assignee: OMRON Corporation, Kyoto (JP)

( * ) Notice: Subject to any disclaimer, the term of this patent is extended or adjusted under 35 U.S.C. 154(b) by 39 days.

(21) Appl. No.: 18/464,246

(22) Filed: Sep. 10, 2023

(65) Prior Publication Data

US 2024/0136860 A1   Apr. 25, 2024
US 2024/0235267 A9   Jul. 11, 2024

(30) Foreign Application Priority Data

Oct. 19, 2022   (JP) ................................. 2022-167894

(51) Int. Cl.
*H02J 50/12* (2016.01)
*H02J 50/80* (2016.01)
*H02M 1/00* (2007.01)
*H02M 3/00* (2006.01)

(52) U.S. Cl.
CPC ............. *H02J 50/12* (2016.02); *H02J 50/80* (2016.02); *H02M 1/0054* (2021.05); *H02M 3/01* (2021.05)

(58) Field of Classification Search
CPC ........ H02J 50/12; H02J 50/80; H02M 1/0054; H02M 3/01; H02M 1/0019; H02M 3/315; H02M 1/0058; H02M 1/0048
See application file for complete search history.

(56) References Cited

U.S. PATENT DOCUMENTS

| 2015/0028691 A1* | 1/2015 | Yamauchi | H02J 50/90 307/104 |
| 2015/0303703 A1* | 10/2015 | Hayashi | H02J 7/02 307/104 |
| 2017/0063145 A1* | 3/2017 | Von Novak, III | G06F 1/26 |

OTHER PUBLICATIONS

Fumio Ichihara et al., "GaN FET Class E Hf band Transmitter for Wireless Energy Transfer", ower Technology/Power System Technology/Semiconductor Power Conversion Joint Study Group 2016, EDD-16-069/SPC-16-156, Nov. 15, 2016, with English abstract, pp. 1-6.

* cited by examiner

Primary Examiner — Lincoln D Donovan
Assistant Examiner — Alex W Lam
(74) Attorney, Agent, or Firm — JCIPRNET

(57) ABSTRACT

A power reception device 3 includes: an estimation circuit 28 estimating a load resistance of an entire contactless power feed apparatus 1; and a reception-side communicator 27 transmitting an estimated value of the load resistance of the entire contactless power feed apparatus 1 to a power transmission device 2. The power transmission device 2 has a power supply circuit 11 supplying AC power to a transmission coil 12 supplying power to the power reception device 3. The power transmission device 2 further includes a control circuit 18 decreasing an input/output gain of a transmission-side DC-DC converter 31 included in the power supply circuit 11 by a predetermined amount when the estimated value of the load resistance is less than a predetermined allowed lower limit, and maintaining or increasing the input/output gain when the estimated value of the load resistance is equal to or greater than the predetermined allowed lower limit.

11 Claims, 3 Drawing Sheets

CONTACTLESS POWER FEED APPARATUS AND POWER TRANSMISSION METHOD

CROSS-REFERENCE TO RELATED APPLICATION

This application claims the priority benefit of Japan application serial No. 2022-167894, filed on Oct. 19, 2022. The entirety of the above-mentioned patent application is hereby incorporated by reference herein and made a part of this specification.

BACKGROUND

Technical Field

The invention relates to a contactless power feed apparatus and a power transmission method executed by the contactless power feed apparatus.

Description of Related Art

Conventionally, the so-called non-contact power feed (also referred to as wireless power feed) technologies for transmitting power through space without via a metal contact, etc., have been under research.

As one of the contactless power feed technologies, power feed through electromagnetic induction is known. In the power feed through electromagnetic induction, in general, by driving an inverter provided at a device on the power transmission side at a switching frequency lower than 1 MHz, AC power is supplied to a coil on the power transmission side to generate electromagnetic induction with a coil on the power reception side. Comparatively, a technology has been proposed to enable switching at a frequency of 6.78 MHz by configuring a power transmitter for power supply as a Class-E amplifier (see Non-Patent Document 1, for example).

PRIOR ART DOCUMENT(S)

Non-Patent Document(s)

[Non-Patent Document 1] Fumio Ichihara, Ichiro Omura, "GaN FET Class E HF band Transmitter for Wireless Energy Transfer", Power Technology/Power System Technology/Semiconductor Power Conversion Joint Study Group 2016, EDD-16-069/SPC-16-156, 2016

In the device on the power transmission side of the contactless power feed apparatus, in order to configure a power supply circuit supplying power to the coil on the power transmission side as a Class-E amplifier, it is required that the conditions as follows be satisfied for the switching element provided in the power supply circuit.

The voltage applied to the switching element at the timing of switching from ON to OFF or from OFF to ON is zero (Zero-Voltage-Switching, referred to as ZVS in the following); and The slope of the voltage applied to the switching element with respect to time change at the timing when the switching element is switched from OFF to ON is zero (i.e., dV/dt=0) (Zero-Voltage-Derivative-Switching, referred to as ZDS in the following).

By satisfying the conditions of ZVS and ZDS, the switching loss in the switching element is reduced as much as possible. As a result, the power transmission efficiency is facilitated. However, as the load connected with the device on the power reception side changes, the conditions for achieving ZVS and ZDS changes.

Therefore, the invention provides a contactless power feed apparatus capable of suppressing the deterioration of the power transmission efficiency even in the case where the load connected with the device on the power reception side changes.

SUMMARY

An aspect of the invention provides a contactless power feed apparatus, including a power transmission device and a power reception device contactlessly receiving power from the power transmission device. The power reception device includes: a resonant circuit, having a reception coil receiving power from the power transmission device; an estimation circuit, estimating a load resistance of an entirety of the contactless power feed apparatus; and a reception-side communicator, transmitting an estimated value of the load resistance of the entirety of the contactless power feed apparatus to the power transmission device. The power transmission device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; a transmission-side communicator, receiving the estimated value of the load resistance of the entirety of the contactless power feed apparatus from the reception-side communicator; and a control circuit, controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount and, in a case where the estimated value of the load resistance of the entirety of the contactless power feed apparatus is equal to or greater than the predetermined allowed lower limit, the input/output gain of the transmission-side DC-DC converter is maintained or increased by a second predetermined amount.

Another aspect of the invention provides a contactless power feed apparatus, including a power transmission device and a power reception device contactlessly receiving power from the power transmission device. The power reception device includes: a resonant circuit, having a reception coil receiving power from the power transmission device; a rectifying and smoothing circuit, rectifying and converting AC power output from the resonant circuit into DC power, and outputting the DC power; a voltmeter, measuring a voltage of the DC power output from the rectifying and smoothing circuit; and a reception-side communicator, transmitting output information to the transmission device, the output information representing an output of the DC power and including a measurement value of the voltage of the DC power output from the rectifying and smoothing circuit. The power transmission device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; a transmission-side communicator, receiving the output information from the reception-side communicator; and a control circuit, estimating a load resistance of an entirety of the contactless power feed apparatus based on the output information, and controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount and, in a case where the estimated value of the load resistance of the entirety of the contactless power feed apparatus is equal to or greater than the predetermined allowed lower limit, the input/output gain of the transmission-side DC-DC converter is maintained or increased by a second predetermined amount.

Another aspect of the invention provides a power transmission method for a contactless power feed apparatus including a power transmission device and a power reception device contactlessly receiving power from the power transmission device. The power reception device includes: a resonant circuit, having a reception coil receiving power from the power transmission device; an estimation circuit, estimating a load resistance of an entirety of the contactless power feed apparatus; and a reception-side communicator, transmitting an estimated value of the load resistance of the entirety of the contactless power feed apparatus to the power transmission device. The power transmission device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; and a transmission-side communicator, receiving the estimated value of the load resistance of the entirety of the contactless power feed apparatus from the reception-side communicator. The power transmission method includes: controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount; and controlling the transmission-side DC-DC converter, so that, in a case where the estimated value of the load resistance of the entirety of the contactless power feed apparatus is greater than or equal to the predetermined allowed lower limit, the input/output gain of the transmission-side DC-DC converter is maintained or increased by a second predetermined amount.

Another aspect of the invention provides a power transmission method for a contactless power feed apparatus including a power transmission device and a power reception device contactlessly receiving power from the power transmission device. The power reception device includes: a resonant circuit, having a reception coil receiving power from the power transmission device; a rectifying and smoothing circuit, rectifying and converting AC power output from the resonant circuit into DC power, and outputting the DC power; a voltmeter, measuring a voltage of the DC power output from the rectifying and smoothing circuit; and a reception-side communicator, transmitting output information to the transmission device, the output information representing an output of the DC power and including a measurement value of the voltage of the DC power output from the rectifying and smoothing circuit. The power transmission device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; and a transmission-side communicator, receiving the output information from the reception-side communicator. The power transmission method includes: estimating a load resistance of an entirety of the contactless power feed apparatus based on the output information; controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount; and controlling the transmission-side DC-DC converter, so that, in a case where the estimated value of the load resistance of the entirety of the contactless power feed apparatus is greater than or equal to the predetermined allowed lower limit, the input/output gain of the transmission-side DC-DC converter is maintained or increased by a second predetermined amount.

DESCRIPTION OF THE EMBODIMENTS

Figure 1:
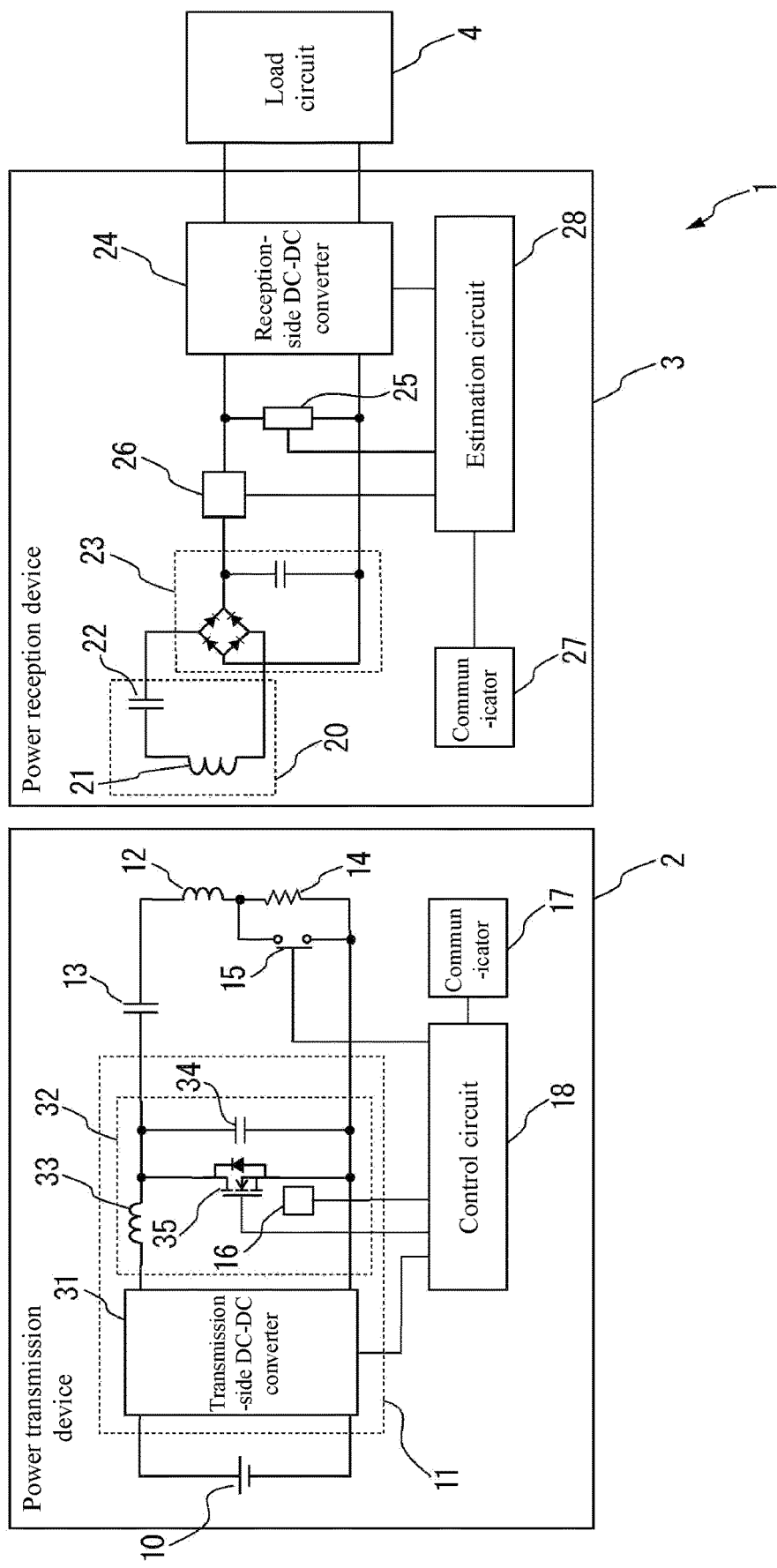
FIG. 1 is a schematic diagram illustrating a configuration of a contactless power feed apparatus according to an embodiment of the invention.

An aspect of the invention provides a contactless power feed apparatus including a power transmission device and a power reception device contactlessly receiving power from the power transmission device. In the contactless power feed apparatus, the power reception device includes: a resonant circuit, having a reception coil receiving power from the power transmission device; an estimation circuit, estimating a load resistance of an entirety of the contactless power feed apparatus; and a reception-side communicator, transmitting an estimated value of the load resistance of the entirety of the contactless power feed apparatus to the power transmission device.

In addition, the power transmission device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; a transmission-side communicator, receiving the estimated value of the load resistance of the entirety of the contactless power feed apparatus from the reception-side communicator, and a control circuit, controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount and, in a case where the estimated value of the load resistance of the entirety of the contactless power feed apparatus is equal to or greater than the predetermined allowed lower limit, the input/output gain of the transmission-side DC-DC converter is maintained or increased by a second predetermined amount.

According to such configuration, the contactless power feed apparatus can suppress the deterioration of the power transmission efficiency even in the case where the load connected with the device on the power reception side changes.

In the contactless power feed apparatus, it may also be that the power transmission device further includes: an additional resistor connected in series with the transmission coil; and an additional resistor switch connected in parallel with the additional resistor, and the control circuit of the power transmission device short-circuits the additional resistor switch when power transmission from the power transmission device to the power reception device is started and, in a case where the estimated value of the load resistance of the entirety of the contactless power feed apparatus is less than the predetermined allowed lower limit even though the input/output gain of the transmission-side DC-DC converter is decreased to a lower limit of an operation range of the transmission-side DC-DC converter, the control circuit cuts off the additional resistor switch.

With such configuration, in the contactless power feed apparatus, even if the load resistance of the power reception device increases, the load resistance of the entire contactless power feed apparatus can be equal to or greater than the allowed lower limit. As a result, even if the load resistance of the power reception device increases, the contactless power feed apparatus can suppress the deterioration of the power transmission efficiency.

In the contactless power feed apparatus, it may also be that the control circuit of the power transmission device transmits information representing a voltage of the DC power output from the transmission-side DC-DC converter to the power reception device via the transmission-side communicator. In addition, it may also be that the power reception device further includes: a rectifying and smoothing circuit, rectifying and converting AC power output from the resonant circuit into DC power, and outputting the DC power; and a voltmeter measuring a voltage of the DC power output from the rectifying and smoothing circuit. In addition, it may also be that the estimation circuit of the power reception device estimates a load resistance of the power reception device based on the voltage of the DC power measured by the voltmeter, and calculates the estimated value of the load resistance of the entirety of the contactless power feed apparatus based on an estimated value of the load resistance of the power reception device and the information representing the voltage of the DC power output from the transmission-side DC-DC converter, transmitted via the transmission-side communicator, and received via the reception-side communicator.

With the above procedure, the contactless power feed apparatus can accurately estimate the load resistance of the entire contactless power feed apparatus.

In such case, it may also be that the power reception device further includes an ammeter measuring a current of the DC power output from the rectifying and smoothing circuit. In addition, it may also be that the estimation circuit of the power reception device estimates a mutual inductance between the transmission coil and the reception coil based on the current of the DC power measured by the ammeter and the information representing the voltage of the DC power output from the transmission-side DC-DC converter, and calculates the estimated value of the load resistance of the entirety of the contactless power feed apparatus based on the mutual inductance that is estimated and the estimated value of the load resistance of the power reception device.

With the above procedure, the contactless power feed apparatus can accurately estimate the load resistance of the entire contactless power feed apparatus.

In the contactless power feed apparatus, it may also be that, in a case where the estimated value of the load resistance of the entirety of the contactless power feed apparatus is less than the predetermined allowed lower limit, the control circuit of the power transmission device sets the first predetermined amount in accordance with the estimated value of the load resistance of the entirety of the contactless power feed apparatus and an input/output gain currently applied to the transmission-side DC-DC converter.

With such configuration, the contactless power feed apparatus can reduce the time required for the load resistance of the entire contactless power feed apparatus to reach or exceed the predetermined allowed lower limit.

Another aspect of the invention provides a contactless power feed apparatus including a power transmission device and a power reception device contactlessly receiving power from the power transmission device. In the contactless power feed apparatus, the power reception device includes: a resonant circuit, having a reception coil receiving power from the power transmission device; a rectifying and smoothing circuit, rectifying and converting AC power output from the resonant circuit into DC power, and outputting the DC power; a voltmeter, measuring a voltage of the DC power output from the rectifying and smoothing circuit; and a reception-side communicator, transmitting output information to the transmission device, the output information representing an output of the DC power and including a measurement value of the voltage of the DC power output from the rectifying and smoothing circuit.

In addition, the power transmission includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; and a transmission-side communicator, receiving the output information from the reception-side communicator; and a control circuit, estimating a load resistance of an entirety of the contactless power feed apparatus based on the output information, and controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount and, in a case where the estimated value of the load resistance of the entirety of the contactless power feed apparatus is equal to or greater than the predetermined allowed lower limit, the input/output gain of the transmission-side DC-DC converter is maintained or increased by a second predetermined amount.

According to such configuration, the contactless power feed apparatus can suppress the deterioration of the power transmission efficiency even in the case where the load connected with the device on the power reception side changes.

Yet another aspect of the invention provides a power transmission method for a contactless power feed apparatus including a power transmission device and a power reception device contactlessly receiving power from the power transmission device. According to the power transmission method, the power reception device includes: a resonant circuit, having a reception coil receiving power from the power transmission device; a rectifying and smoothing circuit, rectifying and converting AC power output from the resonant circuit into DC power, and outputting the DC power; an estimation circuit, estimating a load resistance of an entirety of the contactless power feed apparatus; and a reception-side communicator, transmitting an estimated value of the load resistance of the entirety of the contactless power feed apparatus to the power transmission device. In addition, the power reception device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; and a transmission-side communicator, receiving the estimated value of the load resistance of the entirety of the contactless power feed apparatus from the reception-side communicator. In addition, the power transmission method includes: controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount; and controlling the transmission-side DC-DC converter, so that, in a case where the estimated value of the load resistance of the entirety of the contactless power feed apparatus is greater than or equal to the predetermined allowed lower limit, the input/output gain of the transmission-side DC-DC converter is maintained.

According to such procedures, the power transmission method can suppress the deterioration of the power transmission efficiency even in the case where the load connected with the device on the power reception side changes.

Still another aspect of the invention provides a power transmission method for a contactless power feed apparatus including a power transmission device and a power reception device contactlessly receiving power from the power transmission device. According to the power transmission method, the power reception device includes: a resonant circuit, having a reception coil receiving power from the power transmission device; a rectifying and smoothing circuit, rectifying and converting AC power output from the resonant circuit into DC power, and outputting the DC power; a voltmeter, measuring a voltage of the DC power output from the rectifying and smoothing circuit; and a reception-side communicator, transmitting output information to the transmission device, the output information representing an output of the DC power and including a measurement value of the voltage of the DC power output from the rectifying and smoothing circuit. In addition, the power reception device includes: a transmission coil, supplying power to the power reception device; a power supply circuit, including: a transmission-side DC-DC converter converting a voltage of DC power supplied from a DC power source; and a DC-AC converter, converting the DC power output from the transmission-side DC-DC converter into AC power, the power supply circuit supplying the converted AC power to the transmission coil; and a transmission-side communicator, receiving the output information from the reception-side communicator.

In addition, the power transmission method includes: estimating a load resistance of an entirety of the contactless power feed apparatus based on the output information; controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount; and controlling the transmission-side DC-DC converter, so that, in a case where the estimated value of the load resistance of the entirety of the contactless power feed apparatus is greater than or equal to the predetermined allowed lower limit, the input/output gain of the transmission-side DC-DC converter is maintained or increased by a second predetermined amount.

According to such procedures, the power transmission method can suppress the deterioration of the power transmission efficiency even in the case where the load connected with the device on the power reception side changes.

In the following, a contactless power feed apparatus according to an embodiment of the invention and a power transmission method executed by the contactless power feed apparatus are described with reference to the drawings. The contactless power feed apparatus drives a switching element of a power supply circuit supplying AC power to a coil on a power transmission side by using a switching frequency included in an ISM band with few usage limitations. In addition, the inventors have found that, regarding the switching element of the power supply circuit, even if ZDS is not achieved, if ZVS is achieved, and the difference between the timing at which the switching element is changed from OFF to ON and the timing of becoming the voltage applied to the switching element is sufficiently small, even if the switching element is driven by using a switching frequency included in the ISM band, the switching loss of the switching element can be reduced to an extent that has no problem in practical use.

Therefore, the contactless power feed apparatus estimates the load resistance of the entire contactless power feed apparatus, and controls the voltage of the AC power supplied from the power supply circuit on the power transmission side to the coil on the power transmission side in accordance with the estimated load resistance. Accordingly, it is possible for the contactless power feed apparatus to achieve ZVS and make the difference between the timing at which the switching element changes from OFF to ON and the timing of becoming the voltage applied to the switching element sufficiently small, the switching loss in the switching element can be reduced, and the deterioration of the power transmission efficiency can be suppressed.

FIG. 1 is a schematic diagram illustrating a configuration of a contactless power feed apparatus according to an embodiment of the invention. As shown in FIG. 1, the contactless power feed apparatus 1 has a power transmission device 2 and a power reception device 3 to which power is transmitted contactlessly via space from the power transmission device 2. The power transmission device 2 has a power supply circuit 11, a transmission coil 12, a capacitor 13, an additional resistor 14, an additional resistor switch 15, a thermometer 16, a communicator 17, and a control circuit 18. Meanwhile, the power reception device 3 has a resonant circuit 20 including a reception coil 21 and a resonant capacitor 22, a rectifying and smoothing circuit 23, a reception-side DC-DC converter 24, a voltmeter 25, an ammeter 26, a communicator 27, and an estimation circuit 28. In addition, the power reception device 3 is connected with the load circuit 4. The load circuit 4 is, for example, a secondary battery, a charging circuit of a secondary battery, or a circuit operating by using DC power. The power reception device 3 receives power transmitted via the transmission coil 12 of the power transmission device 2 by using the reception coil 21, and coverts the received power into DC power by using the rectifying and smoothing circuit 23. The power converted into DC is output to the load circuit 4 via the reception-side DC-DC converter 24.

Firstly, the power transmission device 2 is described. The power supply circuit 11 supplies the AC power having an adjustable voltage to the transmission coil 12. Therefore, the power supply circuit 11 has a transmission-side DC-DC converter 31 and a DC-AC converter 32.

The transmission-side DC-DC converter 31 is a DC-DC converter able to adjust an input/output gain in accordance with the control of the control circuit 18, such as a DC-DC converter of a step-up type, a step-down type, or a step-up/down type DC-DC converter. In addition, the transmission-side DC-DC converter 31 is connected with a DC power source 10 on the input side thereof, converts the voltage of the DC power supplied from the DC power source 10 into a voltage in accordance with the input/output gain set in accordance with the control of the control circuit 18, and outputs the converted voltage.

The DC-AC converter 32 converts the DC power output from the transmission-side DC-DC converter 31 into AC power, and supplies the converted AC power to the transmission coil 12. Therefore, the DC-AC converter 32 has a coil 33, a capacitor 34, and a switching element 35.

The coil 33 is connected between the output terminal on the positive electrode side of the transmission-side DC-DC converter 31 and an end of the transmission coil 12. In addition, an end of the capacitor 34 is connected between the coil 33 and an end of the transmission coil 12, the other end of the capacitor 34 is connected with the output terminal of the negative electrode side of the transmission-side DC-DC converter 31. In addition, the coil 33 and the capacitor 34 convert the DC power output from the transmission-side DC-DC converter 31 into AC power having a switching frequency at which the switching element 35 is switched ON and OFF.

The switching element 35 is connected between the capacitor 34 and the coil 33 so as to be parallel with the capacitor 34. That is, an end of the switching element 35 is connected with the output terminal on the positive electrode side of the transmission-side DC-DC converter 31 via the coil 33, and the other end of the switching element 35 is connected with the output terminal on the negative electrode side of the transmission-side DC-DC converter 31.

In addition, the switching element 35 is an element able to switch ON and OFF by using a switching frequency included in the ISM band. For example, the switching element 17 can be a field effect transistor formed of gallium nitride (GaN FET). The switching terminal (e.g., the gate terminal of the GaN FET) of the switching element 35 is connected with the control circuit 18, and is switched ON and OFF in accordance with a control signal from the control circuit 18. As described above, with the switching element 35 being switched ON and OFF by using the switching frequency, the DC power output from the transmission-side DC-DC converter 31 is converted into the AC power having the switching frequency by the coil 33 and the capacitor 34. The converted AC power is then output to the transmission coil 12.

The transmission coil 12 generates a magnetic field that changes periodically around the transmission coil 12 in accordance with the AC power supplied from the power supply circuit 11. In addition, the transmission coil 12 transmits the AC power to the resonant circuit 20 of the power reception device 3 via the magnetic field.

The capacitor 13 is connected in series with the transmission coil 12 between an output terminal on the positive electrode side of the power supply circuit 11 and an end of the transmission coil 12. In addition, the AC power output from the power supply circuit 11 is supplied to the transmission coil 12 via the capacitor 13.

The additional resistor 14 is connected in series with the transmission coil 12 between the other end of the transmission coil 12 and the output terminal on the negative electrode side of the power supply circuit 11. In addition, the additional resistor 14 is used for adjusting the load resistance of the entire contactless power feed apparatus 1. The resistance value of the additional resistor 14 may be equal to or greater than a allowed lower limit R1 to be described afterwards.

The additional resistor switch 15 is connected in parallel with the additional resistor 14 between the other end of the transmission coil 12 and the output terminal on the negative electrode side of the power supply circuit 11. That is, when the additional resistor switch 15 is turned ON and short-circuited, the DC power flows without going through the additional resistor 14. Meanwhile, when the additional resistor switch 15 is turned OFF and cut off, the DC power flows via the additional resistor 14. The switching of ON/OFF of the additional resistor switch 15 is controlled by the control circuit 18. The additional resistor switch 15 can be arranged as a relay switch. In addition, the additional resistor 14 and the additional resistor switch 15 may also be connected in parallel between the transmission coil 12 and the capacitor 13.

The thermometer 16 is provided near the switching element 35 of the power supply circuit 11 and measures the temperature of the switching element 35. In addition, the thermometer 16 outputs the measurement value of the temperature of the switching element 35 to the control circuit 18.

The communicator 17 is an example of the transmission-side communicator, and is configured to be able to perform radio communication with the communicator 27 of the power reception device 3. Therefore, the communicator 17, for example, has an antenna receiving a radio signal under a predetermined radio communication standard and a communication circuit demodulating such radio signal. Example of the predetermined radio communication standard can include, for example, ISO/IEC 15693, ZigBee (registered trademark) or Bluetooth (registered trademark). When it is possible to communicate with the communicator 27 of the power reception device 3, the communicator 17 receives, from the control circuit 18, voltage information representing the voltage of the AC power output from the power supply circuit 11 to the transmission coil 12. In addition, the communicator 17 generates a radio signal including such voltage information, and transmits the voltage information to the power reception device 3 by outputting such radio signal. In addition, when receiving the radio signal from the communicator 27 of the power reception device 3, the communicator 17 passes the estimated value of the load resistance of the entire contactless power feed apparatus 1 included in the radio signal to the control circuit 18. Details of the load resistance of the entire contactless power feed apparatus 1 will be described afterwards.

The control circuit 18 has a processor, a memory, a gate driver, and a communication interface. In addition, the control circuit 18 switches ON and OFF of the switching element 35 of the power supply circuit 11 via the gate driver by using the switching frequency (e.g., 6.78 MHz or 13.56 MHz) included in the ISM band and the predetermined duty ratio (e.g., 0.5). In addition, the control circuit 18 controls the transmission-side DC-DC converter 31 and the switching of ON/OFF of the additional resistor switch 15 based on the estimated value of the load resistance of the entire contactless power feed apparatus 1 received from the power reception device 3 via the communicator 17. In addition, the control circuit 18 switches ON/OFF of the additional resistor switch 15 based on the measurement value of the temperature of the switching element 35 measured by the thermometer 16. Moreover, the control circuit 18 outputs the voltage information representing the voltage of the DC power output from the transmission-side DC-DC converter 31. The control circuit 18 may obtain the voltage of the DC power output from the transmission-side DC-DC converter 31 based on the voltage of the DC power source 10 and a constant of each circuit element of the power supply circuit 11 stored in advance in the memory and the input/output gain currently applied to the transmission-side DC-DC converter 31. Alternatively, a voltmeter (not shown) for measuring the voltage of the DC power output from the transmission-side DC-DC converter 31 may also be provided between the transmission-side DC-DC converter 31 and the DC-AC converter 32. In addition, the control circuit 18 may also include the measurement value obtained by such voltmeter in the voltage information. Details about the control of the control circuit 18 will be described afterwards.

Then, the power reception device 3 is described.

The resonant circuit 20 is an LC resonant circuit in which the reception coil 21 and the resonant capacitor 22 are connected in series. In addition, an end of the reception coil 21 provided in the resonant circuit 20 is connected with an input terminal of the rectifying and smoothing circuit 23 via the resonant capacitor 22. In addition, the other end of the reception coil 21 is connected with the other input end of the rectifying and smoothing circuit 23. However, the resonant circuit 20 is not limited to the example, and may also be an LC parallel resonant circuit in which the reception coil 21 and the resonant capacitor 22 are connected in parallel.

By resonating with the AC current flowing in the transmission coil 12 of the power transmission device 2 together with the resonant capacitor 22, the reception coil 21 receives power from the transmission coil 12. In addition, the reception coil 21 outputs the received power to the rectifying and smoothing circuit 23 via the resonant capacitor 22. That is, the inductance of the reception coil 21 and the capacitance of the resonant capacitor 22 are set so that the resonant frequency of the resonant circuit 20 is substantially equal to the switching frequency. The number of turns of the reception coil 21 may be the same as or different from the number of turns of the transmission coil 12 of the power transmission device 2.

The resonant capacitor 22 is connected in series with the reception coil 21. That is, an end of the resonant capacitor 22 is connected with an end of the reception coil 21, and the other end of the resonant capacitor 22 is connected with the rectifying and smoothing circuit 23. In addition, the resonant capacitor 22 outputs the AC power received by resonating with the reception coil 21 to the rectifying and smoothing circuit 23.

The rectifying and smoothing circuit 23, for example, is formed by a full-wave rectifying circuit having four bridge-connected diodes and a smoothing capacitor. One of the two terminals on the input side of the full-wave rectifying circuit is connected with the resonant capacitor 22, and the other of the two terminals on the input side are connected with the reception coil 21. In addition, one of the two terminals on the output side of the full-wave rectifying circuit is connected with an end of the smoothing capacitor, and the other of the two terminals on the output side is connected with the other end of the smoothing capacitor. In addition, the rectifying and smoothing circuit 23 rectifies and converts the AC power output from the resonant circuit 20 into DC power. It is noted that, in place of a full-wave rectifying circuit, the rectifying circuit 23 may also include a half-wave rectifying circuit.

The reception-side DC-DC converter 24 is connected with the output side of the rectifying and smoothing circuit 23, and steps up or down the voltage of the DC power output from the reception-side DC-DC converter 24. In addition, the reception-side DC-DC converter 24 outputs the DC voltage that is stepped up or down to the load circuit 4. The reception-side DC-DC converter 24 may be a step-up type DC-DC converter. By arranging the reception-side DC-DC converter 24 as a step-up type DC-DC converter, it is easy to increase the voltage output from the power reception device 3 to the load circuit 4. Therefore, it is easy to increase the load resistance of the entire contactless power feed apparatus 1. As a result, it is easy to achieve ZVS in the power supply circuit 11 of the power transmission device 2. Details of the estimation of the load resistance of the entire contactless power feed apparatus 1 and the control for achieving ZVS will be described afterwards. In addition, in the case that the load circuit 4 can sufficiently operate at the voltage in accordance with the AC power received from the power reception device 3, the reception-side DC-DC converter 24 may be omitted.

The voltmeter 25 is connected between the rectifying and smoothing circuit 23 and the reception-side DC-DC converter 24 and measures a voltage (referred to as output voltage in the following) of the DC power output from the rectifying and smoothing circuit 23. In addition, the voltmeter 25 outputs the measurement value of the output voltage to the estimation circuit 28.

The ammeter 26 is connected between the rectifying and smoothing circuit 23 and the reception-side DC-DC converter 24 or between the reception-side DC-DC converter 24 and the load circuit 4, and measures a current (referred to as output current in the following) of the DC power output from the rectifying and smoothing circuit 23. In addition, the ammeter 26 outputs the measurement value of the output current to the estimation circuit 28.

The communicator 27 is an example of the reception-side communicator, and is configured to be able to perform radio communication with the communicator 17 of the power transmission device 2. Therefore, the communicator 27 has an antenna receiving a radio signal under the radio communication standard followed by the communicator 17 and a communication circuit demodulating the radio signal. When it is possible to communicate with the communicator 17 of the power transmission device 2, the communicator 27 passes the voltage information included in the radio signal received from the communicator 17 to the estimation circuit 28. In addition, when receiving the estimated value of the load resistance of the entire contactless power feed apparatus 1 from the estimation circuit 28, the communicator 27 generates a radio signal including the estimated value and outputs the radio signal, thereby transmitting the estimated value of the load resistance of the entire contactless power feed apparatus 1 to the power transmission device 2.

The estimation circuit 28 has a processor, a memory, and a communication interface. In addition, the estimation circuit 28 estimates the load resistance of the entire contactless power feed apparatus 1 based on the measurement value obtained from the voltmeter 25 via the communication interface, the measurement value of the output current obtained from the ammeter 26 via the communication interface, and the voltage information obtained from the communicator 27 via the communication interface. In addition, the estimation circuit 28 notifies the power transmission device of the estimated value of such load resistance by outputting the estimated value of the load resistance of the entire contactless power feed apparatus 1 to the communicator 27.

In the following, the operation of the contactless power feed apparatus 1 is described in detail.

Figure 2:
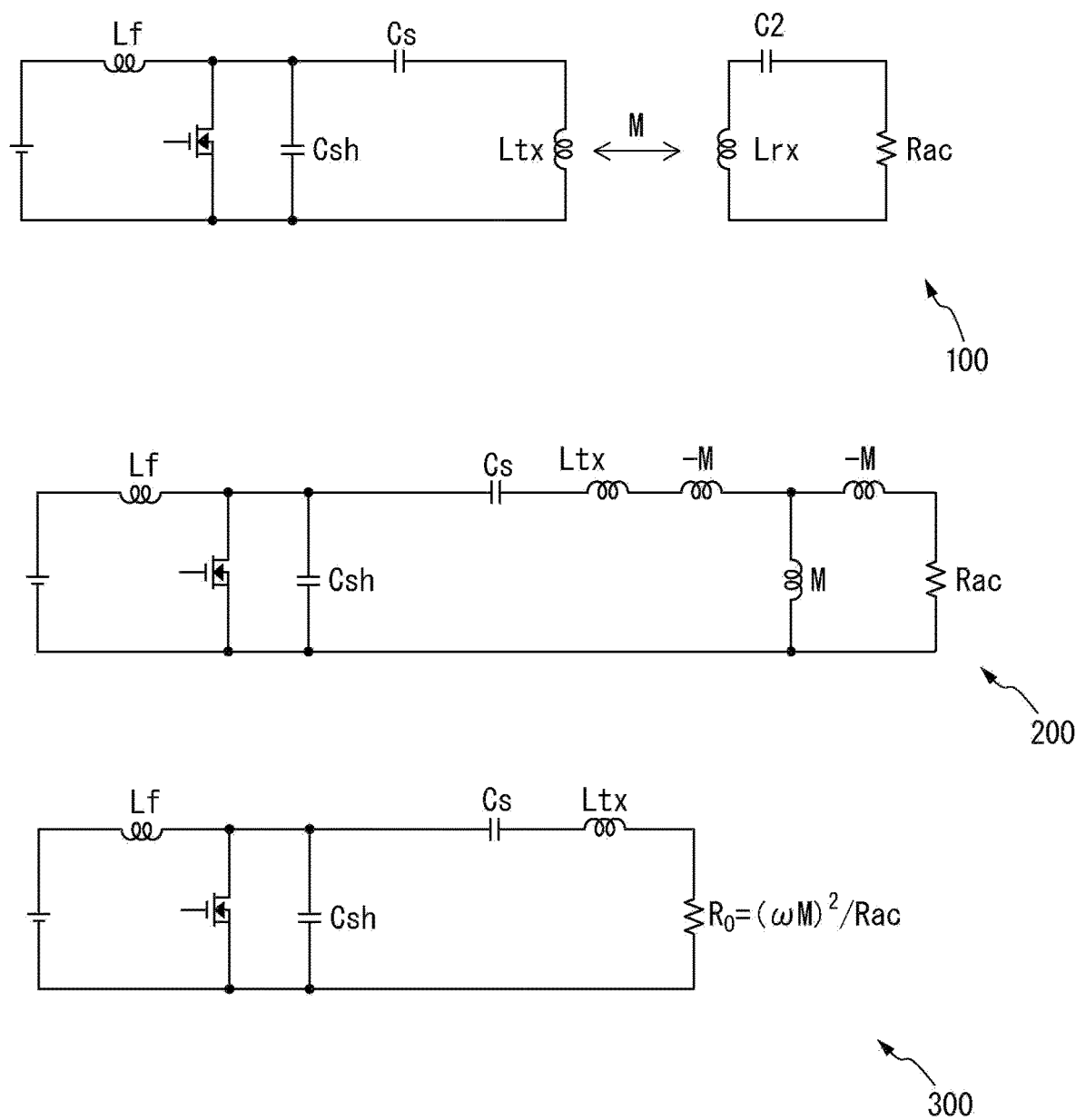
FIG. 2 is an equivalent circuit diagram of the contactless power feed apparatus according to the embodiment.

FIG. 2 is an equivalent circuit diagram of the contactless power feed apparatus 1. In an equivalent circuit 100 shown in FIG. 2, the transmission-side DC-DC converter 31 and the reception-side DC-DC converter 24 of the power reception device 3 are respectively omitted. In addition, the equivalent circuit 100 is an equivalent circuit of the contactless power feed apparatus 1 when the additional resistor switch 15 is short-circuited. Here, Lf, Ltx, and Lrx are respectively the inductances of the coil 33, the transmission coil 12, and the reception coil 21, and Csh, Cs, and C2 are respectively the capacitances of the capacitor 34, the capacitor 13, and the resonant capacitor 22. In addition, Rac is a load resistance of the power reception device 3. In addition, M is the mutual inductance between the transmission coil 12 and the reception coil 21.

In the case where the resonant circuit 20 of the power reception device 3 is resonating, the equivalent circuit 100 can be rewritten as an equivalent circuit 200 or an equivalent circuit 300. At this time, an impedance Z of the entire contactless power feed apparatus 1, that is, the impedance observed from the side of the power transmission device 2 during power transmission is represented as follows:

[Equation 1]

$$1/Z = 1/j\omega M + 1/(Rac - j\omega M) = Rac/(\omega^2 M^2 + j\omega MRac) \quad (1)$$
$$Z = Ro + j\omega M$$
$$Ro = \frac{(\omega \cdot M)^2}{R_{ac}}$$
$$M = k \cdot \sqrt{L_{TX} \cdot L_{RX}}$$

ω(=2πf) is an angular frequency corresponding to a frequency f (that is, the switching frequency) of the AC power supplied to the transmission coil 12. In addition, k is a coupling degree between the transmission coil 12 and the reception coil 21. In addition, Ro is an equivalent load resistance connected with respect to the entire contactless power feed apparatus 1, that is, a load resistance observed from the side of the power transmission device 2 (simply referred to as the load resistance of the entire contactless power feed apparatus 1) during power transmission.

As can be shown from Equation (1), when the load resistance Rac of the power reception device 3 decreases, the load resistance Ro of the entire contactless power feed apparatus 1 increases. Comparatively, when the load of the power reception device 3 decreases and the load resistance Rac increases, the load resistance Ro of the entire contactless power feed apparatus 1 decreases. Moreover, when the load resistance Ro becomes excessively small, ZVS is no longer achieved, or, compared with the timing at which the switching element 35 becomes ON, the timing at which the voltage applied to the switching element 35 becomes zero is too early. When the timing at which the voltage applied to the switching element 35 becomes zero is too early compared with the timing at which the switching element 35 becomes ON, a loss due to the current flowing in the body diode of the switching element 35 occurs. Details in this regard may be referred to, for example, Chapter 2 of "Load-Independent Class-E Power Conversion", available at https://vtechworks.lib.vt.edu/handle/10919/97601 and published in 2020.

Therefore, the estimation circuit 28 of the power reception device 3 estimates the load resistance Ro of the entire contactless power feed apparatus 1 and notifies the power transmission device 2 of the estimated value via the communicator 27. The control circuit 18 of the power transmission device 2 controls the transmission-side DC-DC converter 31 and the additional resistor switch 15 so that ZVS can be achieved and the difference (simply referred to as timing difference in the following) of the timing at which the voltage applied to the switching element 35 becomes zero with respect to the timing at which the switching element 35 becomes ON is equal to or greater than the allowed lower limit R1, which is a level that has no problem in practical use.

Firstly, the process performed by the estimation circuit 28 of the power reception device 3 is described. The estimation circuit 28 estimates the load resistance Rac of the power reception device 3 for estimating the load resistance Ro of the entire contactless power feed apparatus 1. In addition, the estimation circuit 28 estimates the coupling degree between the transmission coil 12 and the reception coil 21 based on the load resistance Rac of the power reception device 3, the voltage information received from the power transmission device, and the output voltage measured by the voltmeter 25. In addition, the estimation circuit 28 estimates the load resistance Ro of the entire contactless power feed apparatus 1 based on the estimated coupling degree, the inductances of the transmission coil 12 and the reception coil 21, and the switching frequency.

Firstly, regarding the estimation of the load resistance Rac of the power reception device 3, the estimation circuit 28 estimates the load resistance Rac in accordance with the following equation:

[Equation 2]

$$Rac = \frac{Vo}{Io} \cdot \frac{8}{\pi^2} \quad (2)$$

Here, Vo is a measurement value of the output voltage obtained by the voltmeter 25, and Io is a measurement value of the current obtained by the ammeter 26. Since the load resistance Rac is an AC resistance value, Vo/Io is multiplied by 8/π². Also, when the load circuit 4 includes a charging circuit of a secondary battery, in order to manage the charging state of the secondary battery, the power output by the charging circuit from the power reception device 3 to the load circuit 4 is monitored. In such case, the estimation circuit 28 may also estimate the load resistance Rac in accordance with the equation as follows, in place of Equation (2).

[Equation 3]

$$Rac = \frac{Vo^2}{Wo} \cdot \frac{8}{\pi^2} \quad (3)$$

Here, Wo is a current value output from the power reception device 3 to the load circuit 4. The estimation circuit 28 may receive the information representing such power value from the load circuit 4. In such case, the ammeter 26 may be omitted.

In the following, the estimation of the coupling degree between the transmission coil 12 and the reception coil 21 is described. In the memory of the estimation circuit 28, a reference table is stored in advance for each of multiple representative values of the load resistance Rac. The reference table represents the coupling degree of each ratio of the voltage Vy output from the rectifying and smoothing circuit 23 of the power reception device 3 with respect to the voltage Vx output from the transmission-side DC-DC converter 31 of the power transmission device 2. Among the representative values of the load resistance Rac, the estimation circuit 28 specifies a representative value closest to the value of the load resistance Rac estimated in accordance with Equation (2) or (3), and specifies the reference table corresponding to the specified represented value. In addition, the estimation circuit 28 obtains the voltage Vy output from the resonant circuit 20 based on the output voltage Vo measured by the voltmeter 25. In addition, the estimation circuit 28 calculates the ratio of the voltage Vy output from the resonant circuit 20 with respect to the voltage Vx output from the transmission-side DC-DC converter 31 included in the voltage information received from the power transmission device 2. By referring to the specified reference table, the estimation circuit 28 specifies the coupling degree corresponding to the calculated ratio, and estimates the specified coupling degree as an actual coupling degree k between the transmission coil 12 and the reception coil 21.

When estimating the coupling degree k between the transmission coil 12 and the reception coil 21, the estimation circuit 28 estimates the load resistance Ro of the entire contactless power feed apparatus 1 according to the following equation based on the estimated coupling degree k and the estimated value of the load resistance Rac.

[Equation 4]

$$Ro = \frac{(\omega \cdot M)^2}{R_{ac}} \quad M = k \cdot \sqrt{L_{TX} \cdot L_{RX}} \quad (4)$$

As in the above, $\omega(=2\pi f)$ is an angular frequency corresponding to the frequency f of the AC power supplied to the transmission coil 12. In addition, M is a mutual inductance between the transmission coil 12 and the reception coil 21. In addition, Ltx and Lrx are respectively the inductances of the transmission coil 12 and the reception coil 21. The estimation circuit 28 can calculate the estimated value of the load resistance Ro of the entire contactless power feed apparatus 1 by applying the value of $(Ltx \times Lrx)^{1/2}$ and the value of w stored in advance in the memory of the estimation circuit 28 as well as the estimated coupling degree k and load resistance Rac to Equation (4). With the above procedure, the estimation circuit 28 can accurately estimate the load resistance Ro of the entire contactless power feed apparatus 1.

The mutual inductance M may be calculated according to an equation as follows. In such case, the estimation circuit 28 can calculate the mutual inductance M and the load resistance Ro of the entire contactless power feed apparatus 1 without referring to the reference table.

[Equation 5]

$$M = \frac{a \cdot \pi \cdot V_x}{I_o \cdot 2 \cdot \sqrt{2} \cdot \omega} \quad (5)$$

However, Vx is a voltage output from the transmission-side DC-DC converter 31 as described above. In addition, a is a constant of each circuit element from the DC-AC converter 32 to the transmission coil 12 and a constant determined by the duty ratio of the switching element 35 of the DC-AC converter 32. That is, aVx represents the actual value of the voltage output from the transmission coil 12 in the equivalent circuit 200 shown in FIG. 2. The constant a is stored in advance in the memory of the estimation circuit 28. In the case where the control circuit 18 of the power transmission device 2 adjusts the duty ratio of the switching element 35, the control circuit 18 of the power transmission device 2 may include the latest duty ratio applied to the switching element 35 in the voltage information. In addition, the estimation circuit 28 may apply the value of the constant a corresponding to the duty ratio included in the voltage information, among the constants a corresponding to the respective duty ratios stored in the memory in advance, to Equation (5).

In each predetermined period, the estimation circuit 28 estimates the load resistance Ro of the entire contactless power feed apparatus 1 and notifies the power transmission device 2 of the estimated value of the load resistance Ro via the communicator 27.

It is noted that the estimation circuit 28 may turn OFF the reception-side DC-DC converter 24 when the value of the output power calculated from the measurement value of the output voltage Vo and the measurement value of the output current Io or notified by the load circuit 4 is equal to or less than a predetermined amount.

In the following, the process performed by the control circuit 18 of the power transmission device 2 is described. In an idling state until the power transmission from the power transmission device 2 to the power reception device 3 is started, the control circuit 18 cuts off the additional resistor switch 15 to allow current to flow to the additional resistor 14. In addition, when the power transmission from the power transmission device 2 to the power reception device 3 is started, the control circuit 18 turns ON the additional resistor switch 15, that is, the control circuit 18 short-circuits the additional resistor switch 15. Accordingly, current does not flow to the additional resistor 14. It is noted that, the control circuit 18 may determine that the power transmission from the power transmission device 2 to the power reception device 3 is started when the communication between the communicator 17 of the power transmission device 2 and the communicator 27 of the power reception device 3 is established.

Every time when the control circuit 18 receives the estimated value of the load resistance Ro of the entire contactless power feed apparatus 1 from the power reception device 3, the control circuit 18 compares such estimated value with the allowed lower limit R1. In addition, if the estimated value of the load resistance Ro is less than the allowed lower limit R1, the control circuit 18 controls the transmission-side DC-DC converter 31, so that the input/output gain of the transmission-side DC-DC converter 31 is decreased by a predetermined amount (first predetermined amount), that is, the voltage output from the transmission-side DC-DC converter 31 is decreased. Accordingly, the voltage of the AC power supplied to the transmission coil 12 is lowered, so the output voltage Vo and the output current Io in the power reception device 3 also change. Specifically, by decreasing the output voltage Vo together with the decrease of the voltage of the AC power supplied to the transmission coil 12, the load resistance Rac on the power reception side decreases. As a result, the load resistance of the entire contactless power supply apparatus 1 increases. If the estimated value of the load resistance Ro is equal to or greater than the allowed lower limit R1, ZVS is achieved, and the timing difference becomes sufficiently small. Therefore, the control circuit 18 controls the transmission-side DC-DC converter 31, so that the input/output gain of the transmission-side DC-DC converter 31 is maintained without change.

For example, the inductances of the coil 33 and the transmission coil 12 are respectively 1 µH and 3 µH, and the capacitances of the capacitor 34 and the capacitor 13 are respective 330 pF, 202 pF. In addition, the switching element 35 is driven at a switching frequency of 6.78 MHz and a duty ratio of 0.5. In this case, the minimum value of the load resistance Ro of the entire contactless power feed apparatus 1 at which ZVS is achieved and the difference between the timing at which the switching element is changed from OFF to ON and the timing of becoming the voltage applied to the switching element is 41.4Ω. Therefore, the allowed lower limit R1 is set at a value obtained by adding a predetermined offset to 41.4Ω, such as 50Ω.

However, in the case where the load circuit 4 includes a secondary battery or a charging circuit of a secondary battery, since the output current Io is decreased as the secondary battery is approaching fully charged, the load resistance Rac of the power reception device 3 increases. As a result, even if the input/output gain of the transmission-side DC-DC converter 31 is decreased to the lower limit of the operation range, the load resistance Rac is not sufficiently decreased. As a result, the estimated value of the load resistance Ro of the entire contactless power feed apparatus 1 may be unable to reach or exceed the allowed lower limit R1. Therefore, in the case where the estimated value of the load resistance Ro is less than the allowed lower limit R1 even if the control circuit 18 controls the transmission-side DC-DC converter 31 so that the input/output gain of the transmission-side DC-DC converter 31 reaches the lower limit of the operation range of the transmission-side DC-DC converter 31, the additional resistor switch 15 is turned OFF. Accordingly, the current flows to the additional resistor 14 and, as a result, the voltage of the AC power applied to the transmission coil 12 is further decreased. Therefore, it is possible to further decrease the load resistance Rac of the power reception device 3, that is, it is possible to further increase the load resistance Ro of the entire contactless power feed apparatus 1.

In addition, when the measurement value of the temperature of the switching element 35 obtained by the thermometer 16 is equal to or greater than a predetermined upper temperature limit, the control circuit 18 turns OFF the additional resistor switch 15. Accordingly, the current flows to the switching element 35 is reduced, and the switching element 35 is prevented from being excessively heated. In the case where the measurement value of the temperature of the switching element 35 repetitively reaches or exceeds the predetermined upper temperature limit, it is possible that a conductor is present in the vicinity of the transmission coil 12, which may lead to hard switching in the switching element 35. Therefore, it may also be that, in the case where the measurement value of the temperature of the switching element 35 repetitively reaches or exceeds the predetermined upper temperature limit for a predetermined number of times or more within a prescribed period, the transmission-side DC-DC converter 31 is turned OFF, and power transmission is stopped.

Figure 3:
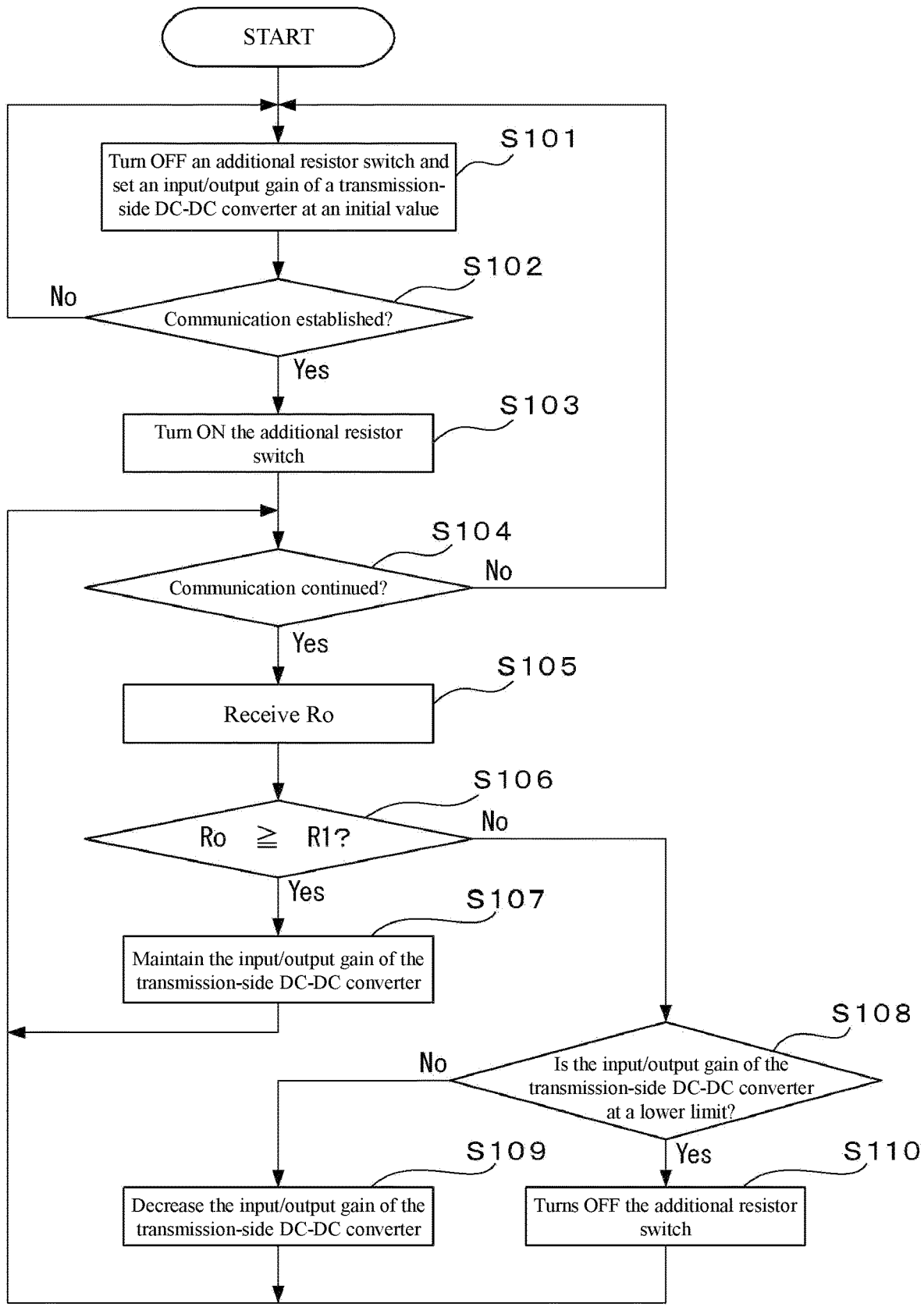
FIG. 3 is a flowchart illustrating an operation of a control process for power transmission.

FIG. 3 is a flowchart illustrating an operation of a control process for power transmission executed by the control circuit 18 of the power transmission device 2. It is noted that, during the period in which the control process for power transmission is executed, the control circuit 18 switches the ON/OFF of the switching element 35 of the power supply circuit 11 at a predetermined switching frequency included in the ISM band.

Before the power transmission from the power transmission device 2 to the power reception device 3 is started, the control circuit 18 turns OFF the additional resistor switch 15 and sets the input/output gain of the transmission-side DC-DC converter 31 at an initial value (Step S101).

The control circuit 18 determines whether the communication between the communicator 17 of the power transmission device 2 and the communicator 27 of the power reception device 3 is established (Step S102). In the case where the communication is not established (Step S102: NO), it is assumed that the power transmission has not started. Therefore, the control circuit 18 repeats the processes since Step S101 after a predetermined time has passed.

When the communication between the communicator 17 of the power transmission device 2 and the communicator 27 of the power reception device 3 is established (Step S102: YES), the control circuit 18 turns ON the additional resistor switch 15, so that the current does not flow to the additional resistor 14 (Step S103).

The control circuit 18 determines whether the communication between the communicator 17 of the power transmission device 2 and the communicator 27 of the power reception device 3 is continued (Step S104). If the communication is lost (Step 5104: NO), the control circuit 18 executes the processes since Step S101 again. Meanwhile, if the communication is continued (Step S104: YES), the control circuit 18 receives the estimated value of the load resistance Ro of the entire contactless power feed apparatus 1 from the communicator 27 of the power reception device 3 via the communicator 17 (Step S105). In addition, the control circuit 18 determines whether the estimated value of the load resistance Ro is equal to or greater than the allowed lower limit (Step S106). If the estimated value of the load resistance Ro is equal to or greater than the allowed lower limit (Step S106:YES), the control circuit 18 controls the transmission-side DC-DC converter 31 so as to maintain the input/output gain of the transmission-side DC-DC converter 31 (Step S107). In addition, the control circuit 18 repeats the processes since Step S104.

Meanwhile, if the estimated value of the load resistance Ro is less than the allowed lower limit (Step S106:NO), the control circuit 18 determines whether the input/output gain of the transmission-side DC-DC converter 31 reaches the lower limit of the operation range (Step S108). If the input/output gain of the transmission-side DC-DC converter 31 is greater than the lower limit of the operation range (Step S108: NO), the control circuit 18 controls the transmission-side DC-DC converter 31, so as to decrease the input/output gain of the transmission-side DC-DC converter 31 by a predetermined amount (Step S109). In addition, the control circuit 18 repeats the processes since Step S104.

Meanwhile, if the input/output gain of the transmission-side DC-DC converter 31 reaches the lower limit of the operation range (Step S108: YES), the control circuit 18 turns OFF the additional resistor switch 15, so that the current flows to the additional resistor 14 (Step S110). In addition, the control circuit 18 repeats the processes since Step S104.

As described above, the contactless power feed apparatus drives a switching element of a power supply circuit supplying AC power to a coil on a power transmission side by using a switching frequency included in an ISM band with few usage limitations. In addition, the contactless power feed apparatus estimates the load resistance of the entire contactless power feed apparatus. Therefore, the contactless power feed apparatus controls the voltage of the AC power supplied from the power supply circuit on the power transmission side to the coil on the power transmission side, so that the load resistance of the entire contactless power feed apparatus satisfies the condition that ZVS can be achieved and that the difference between the timing at which the switching element is changed from OFF to ON and the timing of becoming the voltage applied to the switching element can be sufficiently small. Accordingly, the contactless power supply apparatus can alleviate the switching loss in the switching element to suppress the deterioration of the power transmission efficiency.

According to a modified example, the control circuit 18 of the power transmission device 2 may also determine the adjustment amount of the input/output gain based on the input/output gain currently applied to the transmission-side DC-DC converter 31 and the estimated value of the load resistance Ro of the entire contactless power feed apparatus 1 received from the power reception device 3. In such case, the memory of the control circuit 18 stores the reference table representing the adjustment amount (the predetermined amount in the above flowchart) for making the load resistance Ro of the entire contactless power feed apparatus 1 equal to or greater than the predetermined allowed lower limited value R1 for each combination of the input/output gain of the transmission-side DC-DC converter 31 and the load resistance Ro of the entire contactless power feed apparatus 1. In addition, the control circuit 18 may specify the adjustment amount corresponding to the combination of the input/output gain currently applied to the transmission-side DC-DC converter 31 and the estimated value of the load resistance Ro of the entire contactless power feed apparatus 1 received from the power reception device 3 by referring to such reference table. In addition, the control circuit 18 may decrease the input/output gain of the transmission-side DC-DC converter 31 by the specified adjustment amount. Accordingly, the control circuit 18 can reduce the time required until the load resistance Ro of the entire contactless power feed apparatus 1 reaches or exceeds the predetermined allowed lower limit R1. It is noted that, in the reference table, the time when the additional resistor switch 15 is short-circuited and the time when the additional resistor switch 15 is cut off may be prepared separately. In such case, the control circuit 18 may switch the reference table to be referred to in accordance with whether the additional resistor switch 15 is short-circuited or cut off.

In addition, it may also be that when the estimated value of the load resistance Ro of the entire contactless power feed apparatus 1 exceeds a predetermined threshold, the control circuit 18 increases the input/output gain of the transmission-side DC-DC converter 31 by a predetermined amount (second predetermined amount). Accordingly, the control circuit 18 can appropriately suppress the switching loss of the switching element 35. The predetermined threshold is set at a value greater than the allowed lower limit by a predetermined maintaining offset value. In addition, the predetermined amount at the time of increasing the input/output gain may be the same as or different from the predetermined amount at the time of decreasing the input/output gain.

It is noted that the load resistance Rac of the power reception device 3 becomes constant through the configuration of the load circuit 4. In such case, the load resistance Rac that is a constant value is stored in advance in the memory of the estimation circuit 28. In addition, the estimation circuit 28 may also estimate the load resistance Ro of the entire contactless power feed apparatus 1 based on the load resistance Rac that is a constant value. In addition, in the case where the load resistance Rac of the power reception device 3 is constant, the estimation circuit 28 may also assume that the coupling degree between the transmission coil 12 and the reception coil 21 is the assumed minimum value when the power transmission from the power transmission device 2 to the power reception device 3 is executed. In addition, the estimation circuit 28 may also estimate the load resistance Ro of the entire contactless power feed apparatus 1 based on the assumed minimum value of the coupling degree.

According to another modified example, the control circuit 18 of the power transmission device 2 may also estimate the load resistance of the entire contactless power feed apparatus 1. In such case, the inductance of each coil and the reference table used for estimating the load resistance of the entire contactless power feed apparatus 1 are stored in advance in the memory of the control circuit 18. Moreover, the communicator 27 of the power reception device 3 generates a radio signal including output information and transmits the radio signal to the power transmission device 2. The output information includes the measurement value of the output voltage obtained by the voltmeter 25 and the measurement value of the output current obtained by the ammeter 26 or the power value received from the load circuit 4. The output information represents the output of the DC power from the rectifying and smoothing circuit 23. In addition, the communicator 17 of the power transmission device 2 passes the output information included in the received radio signal to the control circuit 18. The control circuit 18 may refer to the output information and estimate the load resistance of the entire contactless power feed apparatus 1 by executing the same processes as the processes of the estimation circuit 28 in the above embodiment. In addition, the control circuit 18 may exert control on the transmission-side DC-DC converter 33 and perform switching between short-circuiting and cutting off the additional resistor switch 15 based on the estimated load resistance of the entire contactless power feed apparatus 1. In the modified example as well, the effects same as the effects of the above embodiment can be attained.

In addition, in the embodiment or each modified example, in the case where the communicator of the power transmission device and the communicator of the power reception device can be connected in a wired manner, a communication circuit able to perform wired communication of a signal including the voltage information and a signal including the estimated value of the load resistance of the entire contactless power feed apparatus may be provided.

Accordingly, a person skilled in the art can make various modifications within the scope of the invention to suit the embodiment.

What is claimed is:

1. A contactless power feed apparatus, comprising a power transmission device and a power reception device contactlessly receiving power from the power transmission device,
wherein the power reception device comprises:
a resonant circuit, having a reception coil receiving power from the power transmission device;
an estimation circuit, estimating a load resistance of an entirety of the contactless power feed apparatus; and
a reception-side communicator, transmitting an estimated value of the load resistance of the entirety of the contactless power feed apparatus to the power transmission device,
wherein the power transmission device comprises:
a transmission coil, supplying power to the power reception device;
a power supply circuit, comprising: a transmission-side DC-DC converter converting a voltage of DC power supplied from a DC power source; and a DC-AC converter, converting the DC power output from the transmission-side DC-DC converter into AC power, wherein the power supply circuit supplies the converted AC power to the transmission coil;
a transmission-side communicator, receiving the estimated value of the load resistance of the entirety of the contactless power feed apparatus from the reception-side communicator; and
a control circuit, controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount and, in a case where the estimated value of the load resistance of the entirety of the contactless power feed apparatus is equal to or greater than the predetermined allowed lower limit, the input/output gain of the transmission-side DC-DC converter is maintained or increased by a second predetermined amount.

2. The contactless power feed apparatus as claimed in claim 1, wherein the power transmission device further comprises: an additional resistor connected in series with the transmission coil; and an additional resistor switch connected in parallel with the additional resistor,
wherein the control circuit of the power transmission device short-circuits the additional resistor switch when power transmission from the power transmission device to the power reception device is started and, in a case where the estimated value of the load resistance of the entirety of the contactless power feed apparatus is less than the predetermined allowed lower limit even though the input/output gain of the transmission-side DC-DC converter is decreased to a lower limit of an operation range of the transmission-side DC-DC converter, the control circuit cuts off the additional resistor switch.

3. The contactless power feed apparatus as claimed in claim 1, wherein the control circuit of the power transmission device transmits information representing a voltage of the DC power output from the transmission-side DC-DC converter to the power reception device via the transmission-side communicator,
the power reception device further comprises: a rectifying and smoothing circuit, rectifying and converting AC power output from the resonant circuit into DC power, and outputting the DC power; and a voltmeter measuring a voltage of the DC power output from the rectifying and smoothing circuit,
wherein the estimation circuit of the power reception device estimates a load resistance of the power reception device based on the voltage of the DC power measured by the voltmeter, and calculates the estimated value of the load resistance of the entirety of the contactless power feed apparatus based on an estimated value of the load resistance of the power reception device and the information representing the voltage of the DC power output from the transmission-side DC-DC converter, transmitted via the transmission-side communicator, and received via the reception-side communicator.

4. The contactless power feed apparatus as claimed in claim 3, wherein the power reception device further comprises an ammeter measuring a current of the DC power output from the rectifying and smoothing circuit, and
the estimation circuit of the power reception device estimates a mutual inductance between the transmission coil and the reception coil based on the current of the DC power measured by the ammeter and the information representing the voltage of the DC power output from the transmission-side DC-DC converter, and calculates the estimated value of the load resistance of the entirety of the contactless power feed apparatus based on the mutual inductance that is estimated and the estimated value of the load resistance of the power reception device.

5. The contactless power feed apparatus as claimed in claim 1, wherein in a case where the estimated value of the load resistance of the entirety of the contactless power feed apparatus is less than the predetermined allowed lower limit, the control circuit of the power transmission device sets the first predetermined amount in accordance with the estimated value of the load resistance of the entirety of the contactless power feed apparatus and an input/output gain currently applied to the transmission-side DC-DC converter.

6. The contactless power feed apparatus as claimed in claim 2, wherein the control circuit of the power transmission device transmits information representing a voltage of the DC power output from the transmission-side DC-DC converter to the power reception device via the transmission-side communicator,
the power reception device further comprises: a rectifying and smoothing circuit, rectifying and converting AC power output from the resonant circuit into DC power, and outputting the DC power; and a voltmeter measuring a voltage of the DC power output from the rectifying and smoothing circuit,
wherein the estimation circuit of the power reception device estimates a load resistance of the power reception device based on the voltage of the DC power measured by the voltmeter, and calculates the estimated value of the load resistance of the entirety of the contactless power feed apparatus based on an estimated value of the load resistance of the power reception device and the information representing the voltage of the DC power output from the transmission-side DC-DC converter, transmitted via the transmission-side communicator, and received via the reception-side communicator.

7. The contactless power feed apparatus as claimed in claim 6, wherein the power reception device further comprises an ammeter measuring a current of the DC power output from the rectifying and smoothing circuit, and
the estimation circuit of the power reception device estimates a mutual inductance between the transmission coil and the reception coil based on the current of the DC power measured by the ammeter and the information representing the voltage of the DC power output from the transmission-side DC-DC converter, and calculates the estimated value of the load resistance of the entirety of the contactless power feed apparatus based on the mutual inductance that is estimated and the estimated value of the load resistance of the power reception device.

8. The contactless power feed apparatus as claimed in claim 2, wherein in a case where the estimated value of the load resistance of the entirety of the contactless power feed apparatus is less than the predetermined allowed lower limit, the control circuit of the power transmission device sets the first predetermined amount in accordance with the estimated value of the load resistance of the entirety of the contactless power feed apparatus and an input/output gain currently applied to the transmission-side DC-DC converter.

9. A contactless power feed apparatus, comprising a power transmission device and a power reception device contactlessly receiving power from the power transmission device,
wherein the power reception device comprises:
a resonant circuit, having a reception coil receiving power from the power transmission device;
a rectifying and smoothing circuit, rectifying and converting AC power output from the resonant circuit into DC power, and outputting the DC power;
a voltmeter, measuring a voltage of the DC power output from the rectifying and smoothing circuit; and
a reception-side communicator, transmitting output information to the transmission device, the output information representing an output of the DC power and comprising a measurement value of the voltage of the DC power output from the rectifying and smoothing circuit,
wherein the power transmission device comprises:
a transmission coil, supplying power to the power reception device;
a power supply circuit, comprising: a transmission-side DC-DC converter converting a voltage of DC power supplied from a DC power source; and a DC-AC converter, converting the DC power output from the transmission-side DC-DC converter into AC power, wherein the power supply circuit supplies the converted AC power to the transmission coil;
a transmission-side communicator, receiving the output information from the reception-side communicator; and
a control circuit, estimating a load resistance of an entirety of the contactless power feed apparatus based on the output information, and controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount and, in a case where the estimated value of the load resistance of the entirety of the contactless power feed apparatus is equal to or greater than the predetermined allowed lower limit, the input/output gain of the transmission-side DC-DC converter is maintained or increased by a second predetermined amount.

10. A power transmission method for a contactless power feed apparatus comprising a power transmission device and a power reception device contactlessly receiving power from the power transmission device,
wherein the power reception device comprises:
a resonant circuit, having a reception coil receiving power from the power transmission device;
an estimation circuit, estimating a load resistance of an entirety of the contactless power feed apparatus; and
a reception-side communicator, transmitting an estimated value of the load resistance of the entirety of the contactless power feed apparatus to the power transmission device,
wherein the power transmission device comprises:
a transmission coil, supplying power to the power reception device;
a power supply circuit, comprising: a transmission-side DC-DC converter converting a voltage of DC power supplied from a DC power source; and a DC-AC converter, converting the DC power output from the transmission-side DC-DC converter into AC power, wherein the power supply circuit supplies the converted AC power to the transmission coil; and
a transmission-side communicator, receiving the estimated value of the load resistance of the entirety of the contactless power feed apparatus from the reception-side communicator, and
wherein the power transmission method comprises:
controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount; and
controlling the transmission-side DC-DC converter, so that, in a case where the estimated value of the load resistance of the entirety of the contactless power feed apparatus is greater than or equal to the predetermined allowed lower limit, the input/output gain of the transmission-side DC-DC converter is maintained or increased by a second predetermined amount.

11. A power transmission method for a contactless power feed apparatus comprising a power transmission device and a power reception device contactlessly receiving power from the power transmission device,
wherein the power reception device comprises:
a resonant circuit, having a reception coil receiving power from the power transmission device;
a rectifying and smoothing circuit, rectifying and converting AC power output from the resonant circuit into DC power, and outputting the DC power;
a voltmeter, measuring a voltage of the DC power output from the rectifying and smoothing circuit; and
a reception-side communicator, transmitting output information to the transmission device, the output information representing an output of the DC power and comprising a measurement value of the voltage of the DC power output from the rectifying and smoothing circuit,
wherein the power transmission device comprises:
a transmission coil, supplying power to the power reception device;
a power supply circuit, comprising: a transmission-side DC-DC converter converting a voltage of DC power supplied from a DC power source; and a DC-AC converter, converting the DC power output from the transmission-side DC-DC converter into AC power, wherein the power supply circuit supplies the converted AC power to the transmission coil; and a transmission-side communicator, receiving the output information from the reception-side communicator, and wherein the power transmission method comprises:

estimating a load resistance of an entirety of the contactless power feed apparatus based on the output information;

controlling the transmission-side DC-DC converter, so that, in a case where the estimated value of the load resistance of the entirety of the contactless power feed apparatus is less than a predetermined allowed lower limit, an input/output gain of the transmission-side DC-DC converter is decreased by a first predetermined amount; and controlling the transmission-side DC-DC converter, so that, in a case where the estimated value of the load resistance of the entirety of the contactless power feed apparatus is greater than or equal to the predetermined allowed lower limit, the input/output gain of the transmission-side DC-DC converter is maintained or increased by a second predetermined amount.

* * * * *